United States Patent
Flynt et al.

(10) Patent No.: US 7,873,356 B2
(45) Date of Patent: Jan. 18, 2011

(54) SEARCH INTERFACE FOR MOBILE DEVICES

(75) Inventors: David Wayne Flynt, Lake Forest Park, WA (US); Bryan T. Agnetta, Seattle, WA (US); Dane M. Howard, Sammamish, WA (US); Lee Chuan Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 11/424,720

(22) Filed: Jun. 16, 2006

(65) Prior Publication Data

US 2007/0067272 A1 Mar. 22, 2007

Related U.S. Application Data

(60) Provisional application No. 60/718,187, filed on Sep. 16, 2005.

(51) Int. Cl.
*H04M 3/00* (2006.01)
(52) U.S. Cl. .................. 455/418; 455/564; 455/566; 455/550.1
(58) Field of Classification Search ............. 455/418, 455/564, 566, 550; 707/3
See application file for complete search history.

(56) References Cited

U.S. PATENT DOCUMENTS

| | | |
|---|---|---|
| 5,349,174 A | 9/1994 | Van Berkel et al. |
| 5,452,474 A | 9/1995 | Kagawa |
| 5,491,495 A | 2/1996 | Ward et al. |
| 5,855,006 A | 12/1998 | Huemoeller et al. |
| 5,855,015 A | 12/1998 | Shoham |
| 6,044,153 A | 3/2000 | Kaschke |
| 6,118,426 A | 9/2000 | Albert et al. |
| 6,243,074 B1 | 6/2001 | Fishkin et al. |
| 6,243,075 B1 | 6/2001 | Fishkin et al. |
| 6,252,564 B1 | 6/2001 | Albert et al. |
| 6,268,857 B1 | 7/2001 | Fishkin et al. |
| 6,297,805 B1 | 10/2001 | Adler et al. |
| 6,297,838 B1 | 10/2001 | Chang et al. |
| 6,340,957 B1 | 1/2002 | Adler et al. |
| 6,366,302 B1 | 4/2002 | Crosby et al. |
| 6,459,418 B1 | 10/2002 | Comiskey et al. |
| 6,574,624 B1 | 6/2003 | Johnson et al. |
| 6,577,714 B1 | 6/2003 | Darcie et al. |

(Continued)

OTHER PUBLICATIONS

OA dated Dec. 29, 2008 for U.S. Appl. No. 11/424,713, 31 pages.

(Continued)

*Primary Examiner*—Sanh D Phu
(74) *Attorney, Agent, or Firm*—Woodcock Washburn LLP

(57) ABSTRACT

The subject disclosure pertains to systems and methods for providing a user interface for mobile devices. The user interface can include a search function that utilizes user input to search multiple software applications and data sources. Content can be retrieved and presented to a user without requiring the user to navigate to the underlying application or sources supplying the content. The applications or content sources can be local to the mobile device or remotely located, such as an Internet site. One or more types of data can be retrieved and presented to a user based upon the user input. Search results can be displayed and dynamically updated as additional user input is obtained.

20 Claims, 12 Drawing Sheets

U.S. PATENT DOCUMENTS

| | | | |
|---|---|---|---|
| 6,630,922 B2 | 10/2003 | Fishkin et al. |
| 6,639,578 B1 | 10/2003 | Comiskey et al. |
| 6,724,403 B1 | 4/2004 | Santoro et al. |
| 6,746,065 B1 | 6/2004 | Chan |
| 6,795,060 B2 | 9/2004 | Rekimoto et al. |
| 6,801,811 B2 | 10/2004 | Ranganathan et al. |
| 6,825,829 B1 | 11/2004 | Albert et al. |
| 6,872,200 B2 | 3/2005 | Mann et al. |
| 6,873,329 B2 | 3/2005 | Cohen et al. |
| 7,027,040 B2 | 4/2006 | Rekimoto et al. |
| 7,028,264 B2 | 4/2006 | Santoro et al. |
| 7,047,276 B2 | 5/2006 | Liu et al. |
| 7,053,893 B1 | 5/2006 | Molnar et al. |
| 7,053,904 B1 | 5/2006 | Kirk et al. |
| 7,082,409 B1 | 7/2006 | Cherry |
| 7,082,578 B1 | 7/2006 | Fishkin et al. |
| 7,091,927 B1 | 8/2006 | Hagge et al. |
| 7,109,878 B2 | 9/2006 | Mann et al. |
| 7,134,081 B2 | 11/2006 | Fuller et al. |
| 7,139,003 B1 | 11/2006 | Kirk et al. |
| 7,158,682 B2 | 1/2007 | Sano |
| 7,158,878 B2 | 1/2007 | Rasmussen et al. |
| 7,181,438 B1 | 2/2007 | Szabo |
| 7,195,244 B1 | 3/2007 | Feola |
| 7,240,327 B2 | 7/2007 | Singh et al. |
| 7,283,135 B1 | 10/2007 | Cote et al. |
| 7,308,147 B2 | 12/2007 | Sano |
| 7,315,259 B2 | 1/2008 | Sacks |
| 7,325,806 B1 | 2/2008 | Feola |
| 7,376,907 B2 | 5/2008 | Santoro et al. |
| 7,379,811 B2 | 5/2008 | Rasmussen et al. |
| 7,424,541 B2 | 9/2008 | Bourne et al. |
| 7,435,998 B2 | 10/2008 | Kondo |
| 7,437,566 B2 | 10/2008 | Moore et al. |
| 7,451,987 B1 | 11/2008 | Feola |
| 7,481,434 B1 | 1/2009 | Feola |
| 7,483,905 B2 | 1/2009 | Gauweiler |
| 2001/0015721 A1 | 8/2001 | Byun et al. |
| 2002/0044149 A1 | 4/2002 | McCarthy et al. |
| 2002/0065939 A1 | 5/2002 | Liu |
| 2002/0115476 A1 | 8/2002 | Padawer et al. |
| 2002/0133488 A1 | 9/2002 | Bellis et al. |
| 2002/0138474 A1 | 9/2002 | Lee |
| 2002/0143755 A1 | 10/2002 | Wynblatt et al. |
| 2003/0004936 A1 | 1/2003 | Grune et al. |
| 2003/0035008 A1 | 2/2003 | Fuller et al. |
| 2003/0100315 A1 | 5/2003 | Rankin |
| 2003/0158839 A1 | 8/2003 | Faybishenko et al. |
| 2003/0177111 A1 | 9/2003 | Egendorf et al. |
| 2004/0030741 A1 | 2/2004 | Wolton et al. |
| 2004/0043758 A1 | 3/2004 | Sorvari et al. |
| 2004/0053605 A1 | 3/2004 | Martyn et al. |
| 2004/0061716 A1 | 4/2004 | Cheung et al. |
| 2004/0142720 A1 | 7/2004 | Smethers |
| 2004/0203656 A1 | 10/2004 | Andrew et al. |
| 2004/0221243 A1 | 11/2004 | Twerdahl et al. |
| 2004/0250217 A1 | 12/2004 | Tojo et al. |
| 2004/0260692 A1 | 12/2004 | Brill et al. |
| 2005/0050001 A1 | 3/2005 | Lucas et al. |
| 2005/0149496 A1* | 7/2005 | Mukherjee et al. ............. 707/3 |
| 2005/0160076 A1 | 7/2005 | Kanemasa |
| 2005/0207432 A1 | 9/2005 | Velez-Rivera et al. |
| 2005/0228780 A1* | 10/2005 | Diab et al. .................... 707/3 |
| 2005/0240592 A1 | 10/2005 | Mamou et al. |
| 2005/0262062 A1* | 11/2005 | Xia ............................... 707/3 |
| 2006/0039548 A1 | 2/2006 | Houmura et al. |
| 2006/0058026 A1 | 3/2006 | Ang et al. |
| 2006/0106861 A1 | 5/2006 | Torgerson et al. |
| 2006/0123360 A1 | 6/2006 | Anwar et al. |
| 2006/0160528 A1 | 7/2006 | Wang et al. |
| 2006/0168539 A1 | 7/2006 | Hawkins et al. |
| 2006/0242586 A1 | 10/2006 | McGlinchey et al. |
| 2006/0248045 A1 | 11/2006 | Toledano et al. |
| 2007/0067272 A1 | 3/2007 | Flynt et al. |
| 2007/0067726 A1 | 3/2007 | Flynt et al. |
| 2007/0067738 A1 | 3/2007 | Flynt et al. |
| 2007/0192712 A1 | 8/2007 | Lee et al. |
| 2007/0240079 A1 | 10/2007 | Flynt et al. |

OTHER PUBLICATIONS

OA dated Sep. 17, 2008 for U.S. Appl. No. 11/424,706, 32 pages.
U.S. Appl. No. 11/424,706: Final Rejection, dated Dec. 14, 2009.
U.S. Appl. No. 11/424,706: Final Rejection, dated Sep. 17, 2008.
U.S. Appl. No. 11/424,706: Official Action, dated Mar. 27, 2008.
U.S. Appl. No. 11/424,706: Official Action, dated Mar. 9, 2009.
U.S. Appl. No. 11/424,713: Final Rejection, dated Dec. 29, 2008.
U.S. Appl. No. 11/424,713: Final Rejection, dated Feb. 19, 2010.
U.S. Appl. No. 11/424,713: Official Action, dated May 30, 2008.
U.S. Appl. No. 11/424,713: Official Action, dated Sep. 16, 2009.
U.S. Appl. No. 11/424,733: Final Rejection, dated Sep. 24, 2009.
U.S. Appl. No. 11/424,733: Notice of Allowance, dated Feb. 16, 2010.
U.S. Appl. No. 11/424,733: Official Action, dated Apr. 21, 2009.
U.S. Appl. No. 11/765,684: Final Rejection, dated Oct. 27, 2009.
U.S. Appl. No. 11/765,684: Official Action, dated Feb. 22, 2010.
U.S. Appl. No. 11/765,684: Official Action, dated Feb. 25, 2009.
U.S. Appl. No. 11/424,720: Official Action, dated Dec. 1, 2008.
U.S. Appl. No. 11/424,720: Final Rejection, dated Mar. 19, 2009.
U.S. Appl. No. 11/424,720: Official Action, dated Aug. 21, 2009.
U.S. Appl. No. 11/424,720: Notice of Allowance, dated Mar. 5, 2010.
U.S. Appl. No. 11/424,713: non-final Rejection dated Jun. 22, 2010, 13 pages.
U.S. Appl. No. 11/424,706: non-final Rejection dated May 26, 2010, 21 pages.
U.S. Appl. No. 11/765,684: Final Rejection, dated Aug. 5, 2010, 12 pages.
U.S. Appl. No. 11/424,733: Notice of Allowance, dated Oct. 7, 2010, 4 pages.

* cited by examiner

SEARCH INTERFACE FOR MOBILE DEVICES

CROSS-REFERENCE TO RELATED APPLICATIONS

This is an application claiming benefit under 35 U.S.C. 119(e) of U.S. Provisional Patent application Ser. No. 60/718,187 entitled "ENHANCED PORTABLE DEVICE NAVIGATION TOOLS" and filed Sep. 16, 2005. This application is also related to co-pending U.S. patent application Ser. No. 11/424,706, entitled, "CONTENT SHARING USER INTERFACE FOR MOBILE DEVICES", and filed Jun. 16, 2006; U.S. patent application Ser. No. 11/424,713, entitled, "EXTENSIBLE, FILTERED LISTS FOR MOBILE DEVICE USER INTERFACE", and filed Jun. 16, 2006; and U.S. patent application Ser. No. 11/424,733, entitled, "TILE SPACE USER INTERFACE FOR MOBILE DEVICES", and filed Jun. 16, 2006. The entireties of the above-noted applications are incorporated by reference herein.

BACKGROUND

Mobile or portable devices have become increasingly popular and prevalent in today's society. Many users utilize a mobile device, such as a cellphone, as their primary means of communication and carry such devices with them constantly. Mobile devices can include multiple functions such as cellular phone service, voice over Internet protocol ("VoIP") phone service, software applications, email access, Internet capabilities, calendar functions, music players and the like. Functions, features and capabilities have increased both the utility and complexity of mobile devices. It is likely that functions will continue to be added to mobile devices further increasing both usefulness and intricacy.

While consumers desire additional functionality, the sheer volume of information and features make it difficult for users to locate and access commonly used data and functions. Difficulty in locating content makes it impossible for users to fully exploit the capabilities of such devices. The problem is exacerbated by the generally limited user interfaces of mobile devices. Such devices are designed to be small, lightweight and easily portable. Consequently, mobile devices typically have limited display screens, keypads, keyboards and/or other input devices. Due to the size of the user input devices and display screens, it may be difficult for users to enter, retrieve and view information using mobile devices.

Users may have difficulty in accessing the information or function they desire due to the organization of information that may be contained in or accessible by the mobile device, as well as the growing number of functions such devices are capable of supporting. Information is frequently organized based upon the application software that provides or manages the information. Consequently, users can be required to access information by navigating to various software applications and searching within the context of the application. Users can become frustrated when they are unable to locate the desired information or tasks and may be unable to fully exploit the functions and advantages of the mobile device.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns an improved user interface for mobile devices such as smartphones, personal digital assistants (PDAs) and the like. A search system is provided that utilizes user input to search multiple software applications and data sources. Content can be retrieved and presented to a user without requiring the user to navigate to the underlying application or sources supplying content. The applications or content sources can be local to the mobile device or remotely located, such as an Internet site. One or more types of data can be retrieved and presented to a user based upon the user input. Search results can be displayed and dynamically updated as additional user input is obtained.

Search results can be organized and presented to users in groups, lists or other arrangements based upon the type or class of the data. For example, if user input consists of the character "A" multiple search results with multiple types of data (e.g., people, documents, music or audio files) can be retrieved where each search result begins with the letter "A." Each type or class of search result can be organized in a separate group or list. The user can navigate through the result groups or lists to view relevant search results. The initial or default list displayed to the user can be dependent upon the context from which the search was generated. For example, if the search commenced while a music file was selected, the class of data displayed in the default list can consist of music files. Similarly, if the search commenced while the user was reviewing an email message, the class of data displayed in the default list can include email messages.

The search system can also provide a set of keywords that can be mapped to data, services and tasks. Keywords can be a predefined set of words, however the data or task to which a keyword is mapped can be dynamic. For example, a keyword can map to a particular website in one geographic context, and the same keyword can map to a second, distinct website in a second geographic context. In addition, keywords can provide shortcuts to data, services and mobile device tasks, such as audio settings, power management and the like. Keywords can also be used to access links to remote data and services, such as web sites.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
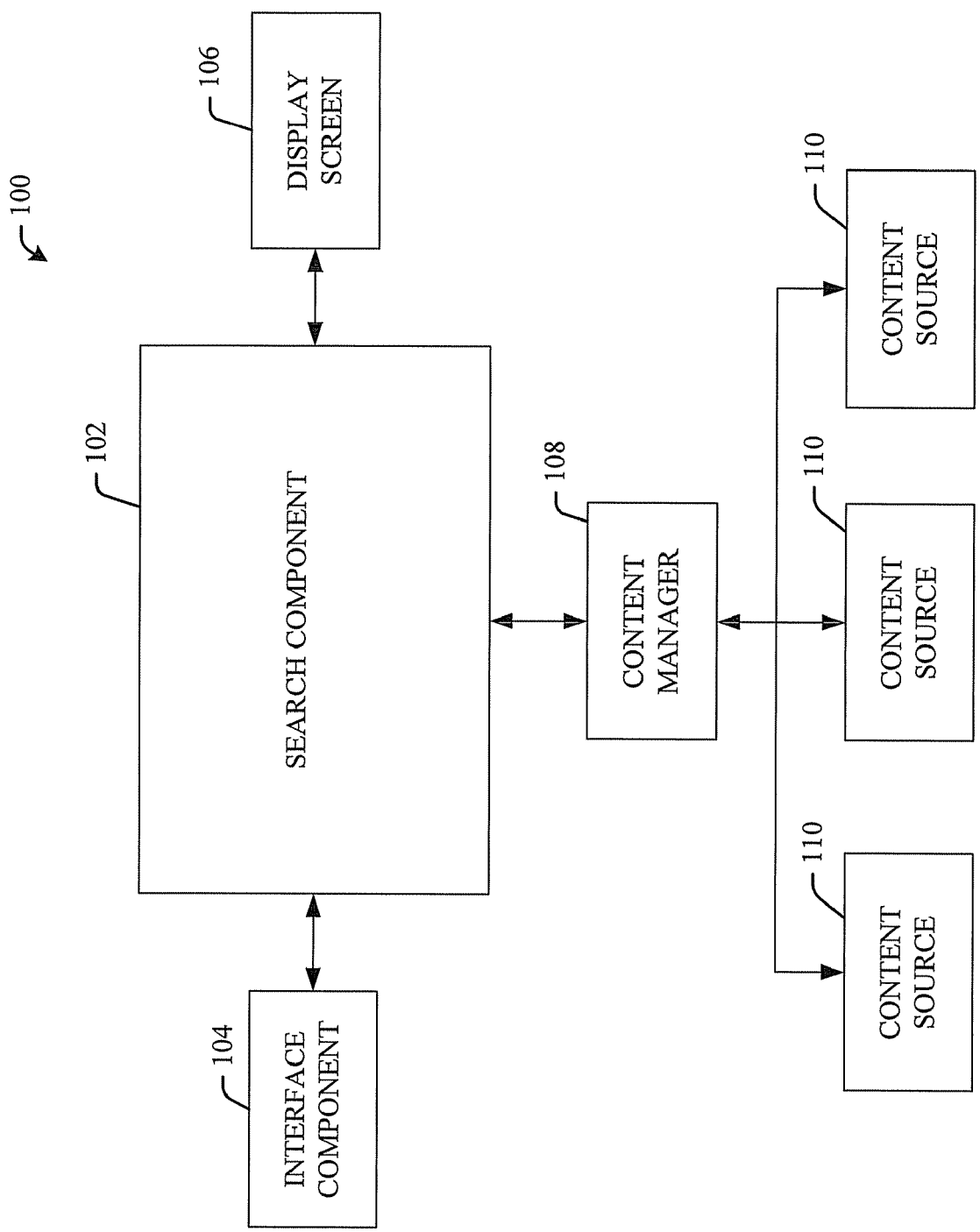
FIG. 1 is a block diagram of a search system for providing content from one or more software applications in accordance with an aspect of the subject matter disclosed herein.

The various aspects of the subject matter described herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Content on mobile devices can take many forms including, but not limited to, data items such as contact information, calendar items, mail, music, photos, documents, and associated tasks. A task is any action that can be carried out on any data item. Access to content is typically provided only through software applications specific to the data type of the content, such as an application used to create or render the specific content data type. Finding relevant content can require first determining the appropriate software application, opening the application and searching for the relevant content within the application. For example, to locate an email message from an individual, a user may be required to navigate to and open an email application and then search for the relevant email message. To call the individual that sent the email, the user can be required to navigate to the space where that contact's communication details are visible (e.g., a contact card containing contact specific information) to access the contact's phone number and call the individual.

An enhanced user interface can be provided that allows users to search multiple applications and data sources and return the results to the interface, without requiring users to navigate away from the user interface. The applications and data sources can be local to the mobile device, such as software applications stored in local memory, or remote, such as data or services accessible through the Internet. In addition, multiple types or classes of data can be located and returned within the search results to ensure that relevant data is provided to users. The search results can be sorted and displayed in a set of groups or lists, with each data type or class stored in a separate group or list.

Referring now to FIG. 1, a search system 100 for a mobile device in accordance with an aspect of the subject matter disclosed herein is illustrated. The system 100 can include a search component 102 that receives input from one or more interface components 104, initiates a search and changes the view of a mobile device display screen 106 according to such input as well as any search results. The system 100 can operate on any type of mobile computing device, including, but not limited to, a PDA, text messenger, cellular phone, pocket personal computer, smartphone, ultra-mobile tablet PC and the like. Input can also include user input using a touch screen, keypad, joystick, button control or the like. In addition, input can include audio data such as input from voice recognition software. A single interface component 104 is illustrated herein for simplicity; however, multiple interface components 104 can be utilized, including separate interface components for user input and input from software applications.

A content manager 108 can utilize search terms or criteria from the search component 102 to obtain content from one or more content sources 110. The content manager 108 can act as or include a content sharing system capable providing a standard interface between the search component 102 and content sources 110. The content manager 108 can facilitate the retrieval of content from content sources 110 such as software applications, without requiring the search component 102 to have knowledge of the underlying data structures or even the identities of the various applications and their data stores.

The content manager 108 can generate one or more queries based upon the search initiated by the search component 102.

The queries can be distributed to one or more content sources 110 and the results of the query or queries can be assembled at the content manager 108 and returned to the search component 102.

The content manager 108 can manage the supply of data and simple tasks associated with the data to the search component 102. Content sources 110 can register categories or classifications of data and associated tasks with the content manager 108, automatically allowing the search component 102 to search the new data categories and tasks. Content sources 110 can also provide the content manager 108 with data supplier components capable of retrieving data from the underlying data stores of the content sources 110. In addition, content sources can provide task executors capable of executing actions or tasks on selected data types or categories. The central content sharing system of the content manager 108 can provide data and tasks in response to queries or requests.

The content manager 108 can obtain data and associated tasks by generating a query specifying the category or type of data requested as well as context used to identify relevant data of the requested category. A set of data requests based upon a search from the search component 102 can be distributed to data supplier components for various content sources 110. The data supplier components can retrieve the relevant data from the underlying data stores of associated content sources 110 and the retrieved results can be assembled and returned to the search component 102. The query, data requests and query results can be specified in a declarative language, such as extended markup language (XML) to facilitate transfer of data without requiring knowledge of data structures by the search component 102.

Figure 2:
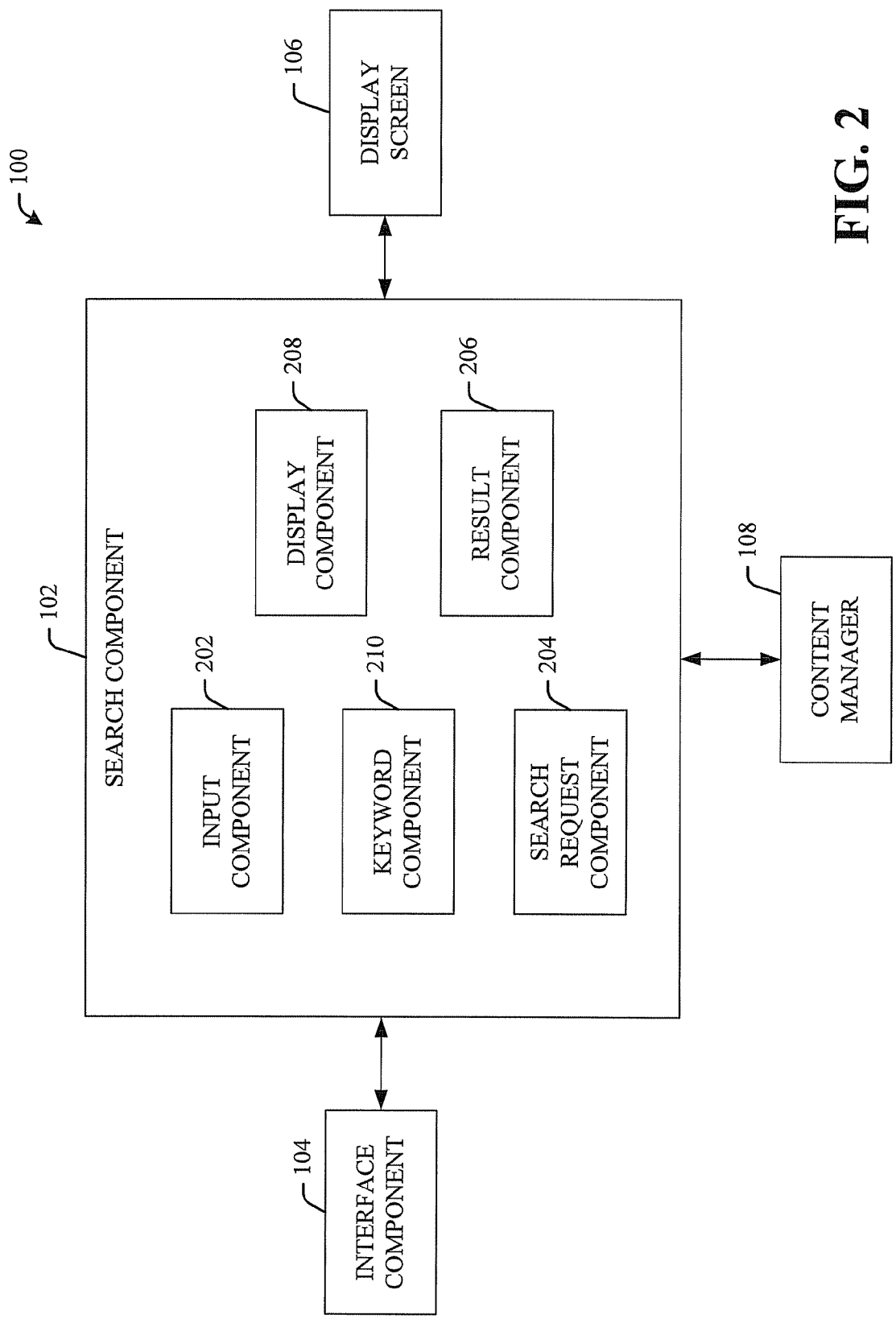
FIG. 2 is a block diagram of a search system for providing content from one or more software applications in accordance with an aspect of the subject matter disclosed herein.

Referring now to FIG. 2, the search component 102 can include an input component 202, a search request component 204, a result component 206 and a display component 208. The input component 202 can receive and/or request input including user input and context from the interface component 104. Input can include search terms or criteria, such as characters entered by a user, the context or current state of the user and/or the type of matching to be performed. For example, the context can specify any data items currently selected and the type of such data items. Context can also include past history of user input. The input component 202 can wait until all search input has been entered before passing search criteria to the search request component 204 to begin a search. Alternatively, searches can be dynamically generated as the user input is received.

The search request component 204 can utilize data from the input component 202 to generate a search based upon search criteria included in the input. A search can include one or more search queries. Search queries within a search can retrieve different types or classes of data. A search query can include search criteria such as data to be matched. For example, the search query can specify that all search results must begin with letters "CA." Search queries can specify the type of matching to be performed for the search criteria (e.g., exact matching and partial matching). For an exact match, each character within the search input should appear in the exact same order and no additional characters should appear in the match. For instance, if the search criteria includes text string "Smith" and an exact match is requested, data labeled "Smith" should be returned, but not information associated with the "Smithsonian." Alternatively, search queries can specify that partial matches are to be returned. For a partial match, each character within the search input should appear in the same order; however, the match can contain additional characters. In the previous example, the search results would include data labeled "Smith" and also any data labeled "Smithsonian." The type of matching to be performed can be determined automatically or based upon user input.

The search request component 204 can generate a single search that can be utilized by an association engine to retrieve relevant data from all available sources. Alternatively, the search request component 204 can generate a set of search queries. A separate search query can be utilized for each type of data or result desired. For instance, separate queries can be used to request email messages, contacts, images, video files and the like.

In addition, multiple search queries can be utilized, where the input has multiple interpretations. For example, the numbers on the keypad of a mobile telephone can correspond to multiple characters in the English language. A search query can be generated for each possible interpretation of input from a keypad. In addition, the search request component 204 can make inferences regarding the interpretations most likely to generate relevant results. Certain letter or number combinations are much more common in a given language than other combinations. For instance, the keypad number "8" can be interpreted as the English language characters "T," "U" or "V" and keypad number "9" can be interpreted as "W," "X," "Y" or "Z." The numerical sequence of "98" can be interpreted as multiple letter combinations. However, certain combinations are far more likely than others. For example, the letter combination "YU" (e.g., Yule, Yul Brynner, Yukon) is likely to generate more search results than the letters "XV."

Results from searches are received or obtained by the result component 206. The result component 206 can receive results from multiple searches at once or results can be obtained at different rates. The result component can wait a predetermined period of time and provide any results received during that period of time for display. The result component 206 can also wait for a signal indicating that any searches are complete before assembling and providing the results for display. Results can be sorted by class or type of data. In addition, within class or type, results can be sorted based upon numerical order, alphabetical order, order in which the results were most recently accessed or any other property of the results.

Search results can include data as well as one or more tasks associated with the retrieved data. For example, a search can retrieve a contact, Joe Smith and one or more tasks associated with Joe Smith. Such tasks can include a task for calling Joe Smith or a task for sending an email message to Mr. Smith. Tasks associated with a search result can be provided to users through a menu. Upon selection of a search result within the list of search results, users can be provided with a menu of tasks associated with the search result.

The display component 208 can utilize the results to render a view of the relevant data to the display screen 106. The display component 208 can modify the view rendered to the display screen 106 based upon the number and type of results to be displayed. In addition, the view can be dependent upon context. The results can be managed in one or more groups or lists by type. The result list currently displayed, referred to herein as the current result list, can be selected based upon an item with focus when the search was initiated. The display component 208 can also update the display to indicate additional classes or types of data with available search results.

The search component 102 can also include a keyword component 210. The keyword component 210 can maintain a predefined set of keywords associated with content, applications and services either local to the mobile device or remotely located. In addition, keywords can provide shortcuts to mobile device tasks, such as audio settings, power management and the like. The keywords can be represented as text strings. The keyword component 210 can search the set of keywords based upon a search generated by the search request component 204. The results of the search of the set of keywords can be provided to the result component 206. Keyword matches can be considered and represented as a separate class or data type and can be rendered in a separate list for display. The use of keywords can allow users to locate data based upon a subject word or keyword associated with the content rather than the literal label of the content. For example, a local weather website named "examplecityweather.com" can be associated with the keyword "weather." Accordingly, a search for the text string "weather" or even just the partial string "wea" would return the keyword "weather" and access to the website "examplecityweather.com."

Keywords can be a predefined set of words, however the data or task to which a keyword is mapped can be dynamic. For example, a keyword can map to a particular website in one geographic context, and the same keyword can map to a second, distinct website in a second geographic context. Dynamic keywords can be particularly advantageous when marketed to service providers. For instance, in the United States, a U.S. company can purchase the rights to the keyword "pizza", such that selection of the word pizza will automatically retrieve information regarding the closest company franchise, the phone number and perhaps coupons or special offers. In Italy, the same keyword "pizza" can be purchased by an entirely different Italian company. When a user is in the United States, entry of the word "pizza" will provide a shortcut to data or services for the U.S. Company. If the user travels to Italy, the same keyword can provide a shortcut to the content specified by the Italian company. The content associated with a keyword can be updated automatically.

Figure 3:
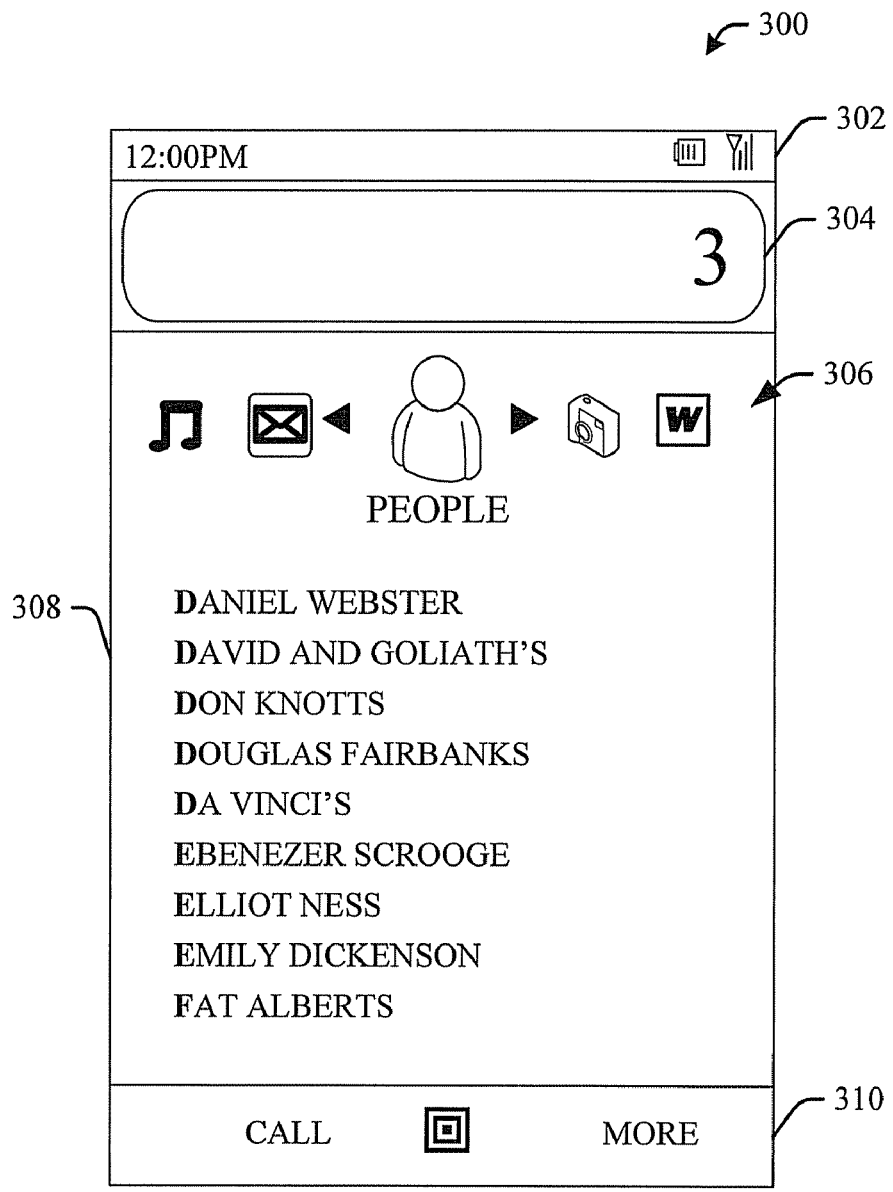
FIG. 3 illustrates an exemplary display screen in accordance with an aspect of the subject matter disclosed herein.

Referring now to FIG. 3, an exemplary user interface display 300 is illustrated. When a user begins to enter input, the display of the mobile device can be updated to display the illustrated user interface display 300 and provide for the entry of input and display of search results. The user interface display 300 can include a title bar 302 that can include icons, images and/or text indicating the current time, battery power and connectivity for the mobile device. The user interface 300 can also include an accumulator 304. The accumulator can display accumulated user input that can be used as search criteria. As the user enters additional input, the accumulator 304 can be updated to include the additional input. The accumulator 304 can also be cleared to start a fresh search. In addition, the user interface 300 can include a search result control bar 306. The search result control bar 306 can include text labels, graphic images or icons indicating the type of results currently displayed upon the user interface 300. The search result control bar 306 can also include text, graphic images or icons indicating additional available result types. The result group 308 can contain a list of results, such as people or contacts. A contact, as used herein, indicates an individual or entity. Data such as phone numbers, email information, addresses and the like can be maintained for each contact. The result group 308 can be represented as a vertical list of results within the user interface display 300. Each result can indicate content available to the user. In addition, the user interface display 300 can include a softkey bar 310 including one or more softkey functions labels (e.g., Call and More). A softkey is typically a button located proximate to the display space. Generally, the function of the button is defined by the softkey function label shown near the button on the display space. Additional controls and features can be included in a user interface display 300.

In the exemplary user interface display 300, the accumulator 304 indicates that the number "3" has been entered as input. Due to the limited keypads of mobile phones and other mobile devices, numbers can be mapped to multiple characters. Typically, the number "3" is mapped to the characters "D," "E" and "F" in the English alphabet. Accordingly, multiple searches can be generated for characters corresponding to the input. Here, search results matching the letters D, E and F can be retrieved and displayed in the result group 308. Although the examples presented herein utilize the English language and characters, the system is not limited to the English alphabet and can utilize alternative characters and symbols (e.g. Russian, Greek, or Japanese characters).

The accumulator 304 can display input as entered, such as the number "3" as shown in FIG. 3. In addition, where the input can be mapped to other characters, the possible mappings or matches can be displayed in the accumulator 304. For instance, if a user enters the number "3" from the keypad, the accumulator 304 can display characters "D," "E" and "F". Alternatively, the accumulator 304 can display only those character mappings that result in the retrieval of search results. For example, if a user enters the number "3" and the search results do not include any items beginning with "F", the accumulator 304 can display only "D" and "E."

Figure 4:
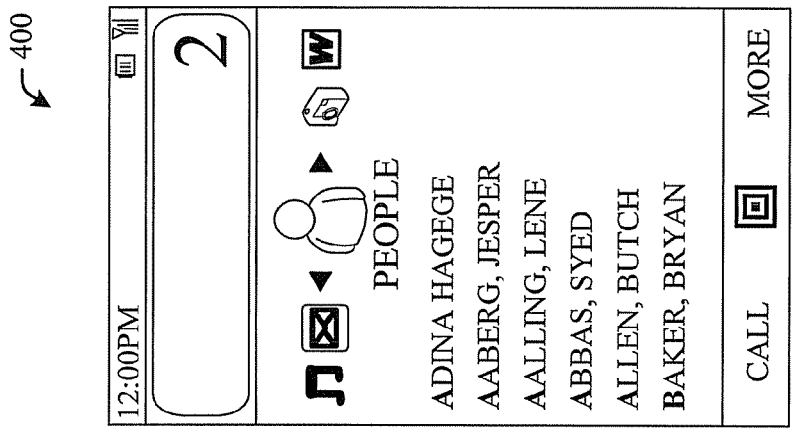
FIG. 4 illustrates an exemplary dynamically updating display screen in accordance with an aspect of the subject matter disclosed herein.
Figure 4:
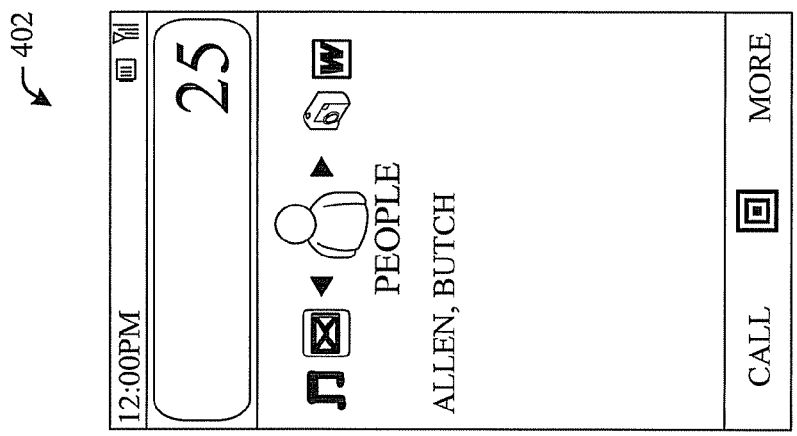
Figure 4:
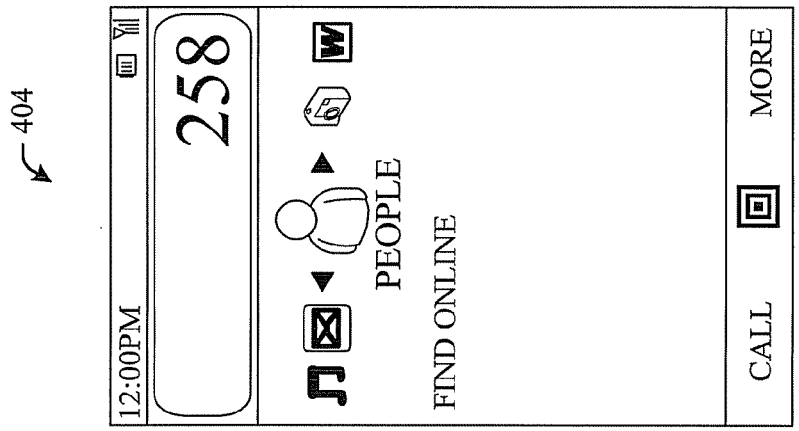

Referring now to FIG. 4, search results can be displayed dynamically as user input is received and entered into the accumulator 304. In an exemplary user interface 400, user input of "2" is shown in the accumulator. A list of people whose names begin with corresponding characters "A," "B" or "C" is displayed in the result group. Here, the input number "2" has been interpreted to include the associated characters based upon a standard telephone keypad. The exemplary search is performed using partial matching. Six names appear on the display screen in the result group. If there are too many results to view on the display, users can scroll through the remainder of the result list by selecting the softkey labeled "More." In addition, scrollbars and other navigation tools or devices can be provided to allow users to view and interact with the search results.

Further input by the user reduces the number of matches and updates the result group, as shown in a second exemplary user interface display 402. The result group can be updated as the user enters additional input, to minimize the amount of input required for the user to obtain the desired data. The user can continue to enter input until sufficient information has been entered to uniquely identify the desired content or until the user can select the desired content from the result group. Here, the user has entered number "5". The number five corresponds to letters "J", "K" and "L". Only one available data matches one of the possible letters for the first character and one of the possible letters for the second character, "Allen, Butch."

Upon entry of additional input, the previous search results can be discarded and a new search can be generated and new content retrieved. Alternatively, where the additional input adds further limitations to the search, such as the preceding example, the previous search results can be evaluated. Search results based upon the additional input can be a subset of the previous search results. In addition, a combination of these search strategies can be utilized to minimize delays in providing search results and maximizing provision of relevant information to users.

The result group may appear as an empty list if no results can be located. Alternatively, if no results are located for a particular class of data, the result group or list for that class of data may not be displayed. In another alternative, a link can be provided to further sources for the desired class of data, as shown in an exemplary user interface display 404. Here, a link to online content is provided to facilitate searches for additional content.

The user can specify the type of matching to be performed for a search, such as exact matching, partial matching or a combination thereof. Users may wish to search locally using partial matching and to search other data sources using exact matching. For instance, if a user is interested in information regarding "Bob Jones," the user can initiate a local search using partial matching with input corresponding to "Bob J." If a local match is not found, the user can enter additional input to complete the search terms (e.g. "Bob Jones") prior to initiating an exact match search of other data sources (e.g., the Internet). Exact matches can be particularly valuable for searches performed using Asian languages. The type of matching to be performed can be determined automatically or based upon user input. For example, searches of non-local data sources can automatically be performed using exact matching.

Figure 5:
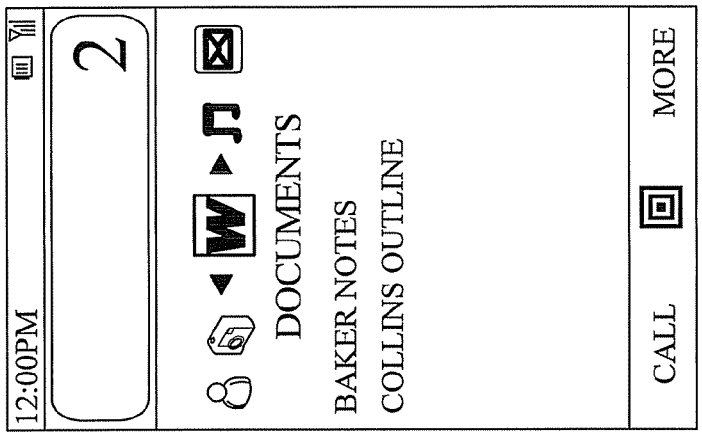
FIG. 5 illustrates exemplary display screens including multiple result types in accordance with an aspect of the subject matter disclosed herein.
Figure 5:
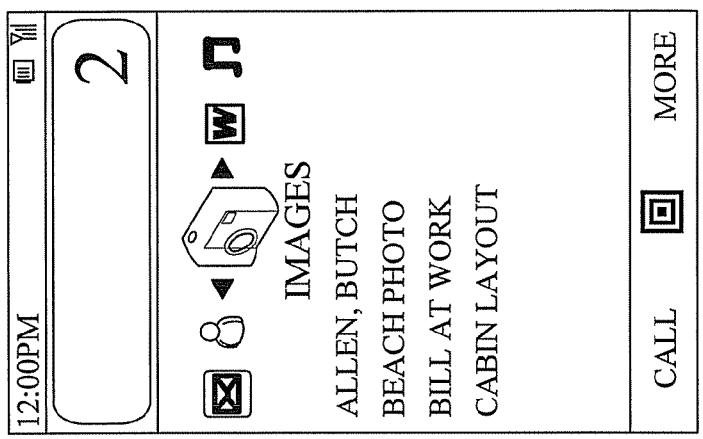
Figure 5:
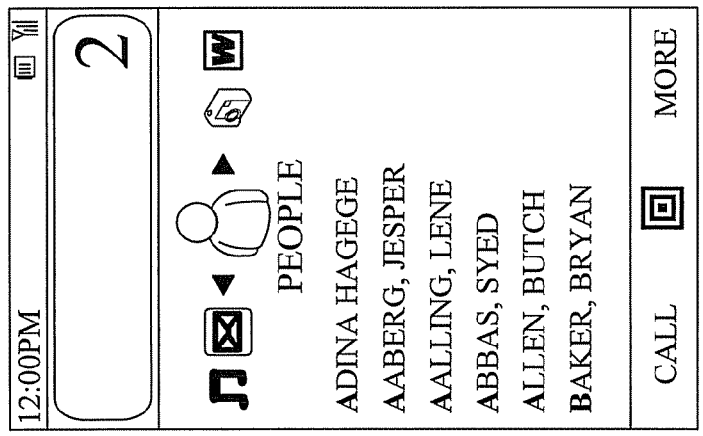

Referring now to FIG. 5, search results can include multiple types of data. Data can be grouped by type or class for display purposes. Although the results are illustrated herein in vertical lists, any format can be used to display search results, including grids, horizontal lists or any other suitable format. In a first user interface display 500, the result group displayed includes a set of people with names that match to keypad input, "2", as translated into corresponding English language characters "A," "B" and "C." Additional result groups can be provided for other data types. The result group displayed on the screen can be based upon the user context at initiation of the search. The data type of the item that has focus when the search is initiated can determine the data type or class of the result group displayed. The search result control bar allows users to switch between different result groups.

A search result control bar can be implemented as a pivot control, also referred to as a pivot widget, to facilitate navigation through the set of result groups. The set of result groups can be represented as a circular list or a continuous loop of result groups. Users can use the pivot control to navigate through the loop using an input device such as a keypad, number pad, stylus or the like to move left or right. The pivot control can be accessed by both hardware and software. In general, a result group can be pivoted when a user makes a left or right action on their hardware control or when a user taps on the left or right side of an on-screen pivot control. If the user continues to select the same direction, the labels of the pivot control and the corresponding result group will cycle back to their starting positions. If the result groups are represented as vertical lists the on-screen pivot control does not require focus to be in the pivot control in order to pivot result groups. A user can hit left or right at any time to pivot when using vertical lists, even if focus is on a particular item in the list, rather than on the pivot control.

A second user interface display 502 illustrates the results of a right pivot from the first user interface display 500. Here, the pivot control is updated to reflect that the current result list contains images. In addition, the result group is updated to show image type search results. A third user interface display 504 illustrates the results of a second right pivot. Again, both the pivot control and result group are updated. Here, a result group of documents retrieved based upon the user input is displayed.

Figure 6:
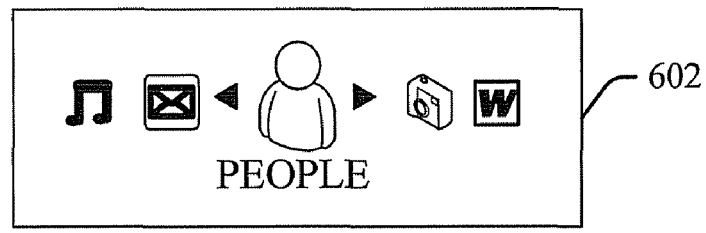
FIG. 6 illustrates exemplary pivot controls in accordance with an aspect of the subject matter disclosed herein.
Figure 6:
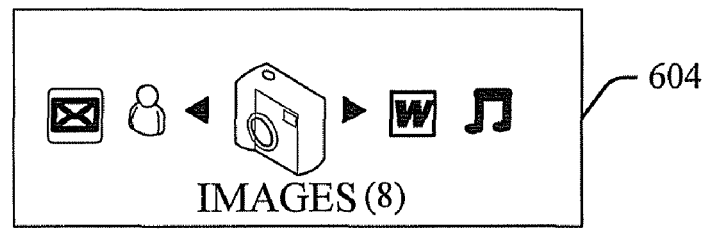
Figure 6:
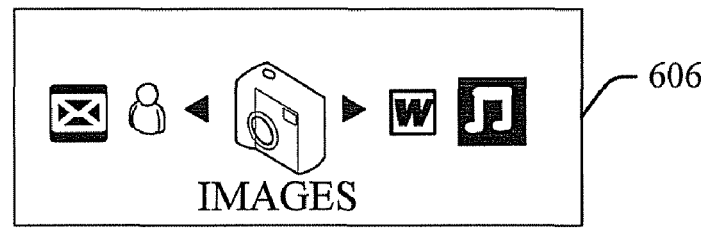

Referring now to FIG. 6, exemplary pivot controls are illustrated. As shown in a first pivot control 602, a name or label for the currently displayed result group can be presented in the center of the pivot control. Names, labels or icons for one or more result groups adjacent to the current result group within the set of result groups can be displayed next to the current result group label. For instance, pivot control 602 includes a graphic of a camera that can represent a result group including one or more pictures. A graphic of a person can represent a result group including contact information. These labels or icons allows users to see the result group that will be displayed if the user pivots right or left. For example, for the first pivot control 602, a right pivot can cause the result groups to shift to the left. The result of the right shift can be seen in a second pivot control 604. Here, the "People" result group has been shifted to the left and is no longer the current result group. The current result group has been updated to the result group adjacent and to the right of the previous result group, here the "Images" result group.

The pivot control or other navigation controls can be displayed utilizing a variety of schemes or models. For example, one or more icons or graphic images can be used either in addition to, or instead of text labels. Graphic images and icons are illustrated herein using line drawings for simplicity; however, pictures or other graphic images can be used throughout the display space.

Pivot controls or navigation controls can also include notifications or alerts. A notification or alert, as used herein, can indicate the presence or update of content. For example, in the second pivot control 604 the number eight is included within parentheses in the text label for the current result group. This parenthetical can indicate that there are eight total results within the result group. In addition, text notifications such as the exemplary parenthetical, text color, font, background or other visual cues can be utilized to alert users to changes in result groups or results. For example, the background for result groups that contain results can be set to a different color than those that contain no results, allowing the user to determine at a glance which result groups contain results associated with the input. In the third pivot control 606, the background for the icons representing mail and music are updated to reflect the existence of results within those result groups.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. For example, the search request component can make inferences regarding the input and/or corresponding characters to utilize in generating search requests. In addition, the search request component and display component can utilize the context to make inferences regarding the type or search results to request and/or display.

In view of the exemplary systems described supra, methodologies that may be implemented in accordance with the disclosed subject matter will be better appreciated with reference to the flowcharts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 7:
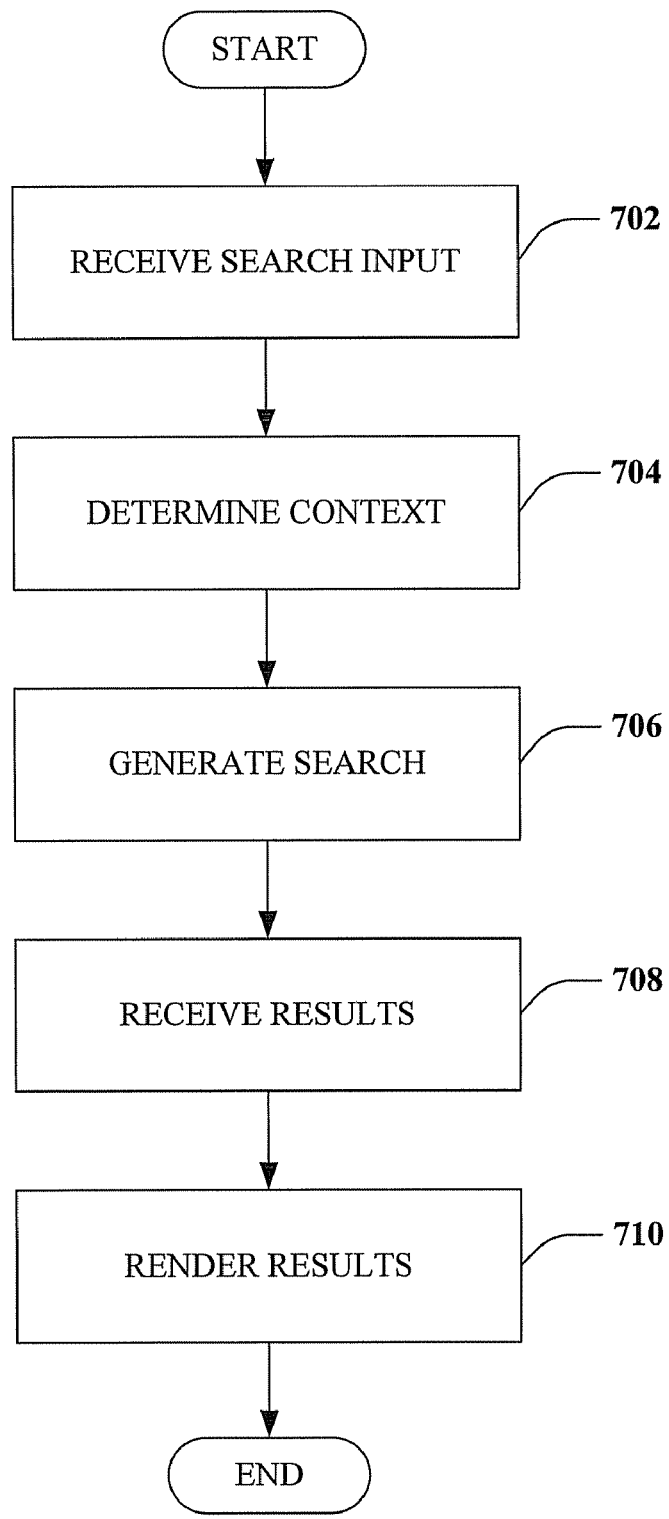
FIG. 7 illustrates a methodology for searching available content and providing results to a user in accordance with an aspect of the subject matter disclosed herein.

Referring now to FIG. 7, a methodology for searching available content and providing the search results to a user is illustrated. At reference numeral 702, search input can be received. Input can include user input such as pressing of buttons on a keypad, verbal direction via a microphone or any other method of input. Input can include search terms or criteria, such as alphanumeric strings. At reference numeral 704, the context can be determined. Context can include the state of the mobile device prior to the initiation of the search. The context can be used to determine the search results to be provided in the display screen. For instance, if a data item is selected, the search can be limited to the type of the selected item. For example, if an email message is selected and a search is initiated, the search can be limited to email messages.

One or more search requests can be generated at reference numeral 706 based upon user input. Separate search requests can be generated for possible interpretations of the user input. For example, as discussed above, certain mobile devices such as mobile phones can have limited keypads, in which the numbered keypad can be mapped to an alphabet. For example, if the user input consists of the number "2", a separate search can be generated for "A," "B" "C" and "2". This can also apply to other languages and alphabets. Separate search requests can be generated for each type of result desired. For instance, separate search requests can be generated for messages, contacts, music files, documents and the like. Alternatively, as discussed above, search requests can be limited based upon context to avoid excessive delays in providing content to users.

At reference numeral 708, the results of the search query or search queries can be received and assembled. Multiple search results can be received at one time. Alternatively, results can be received separately based upon type of result. The results of the one or more search queries can be organized, grouped and assembled prior to display. At reference numeral 710, the results can be rendered to the display screen based upon the results and user context.

Figure 8:
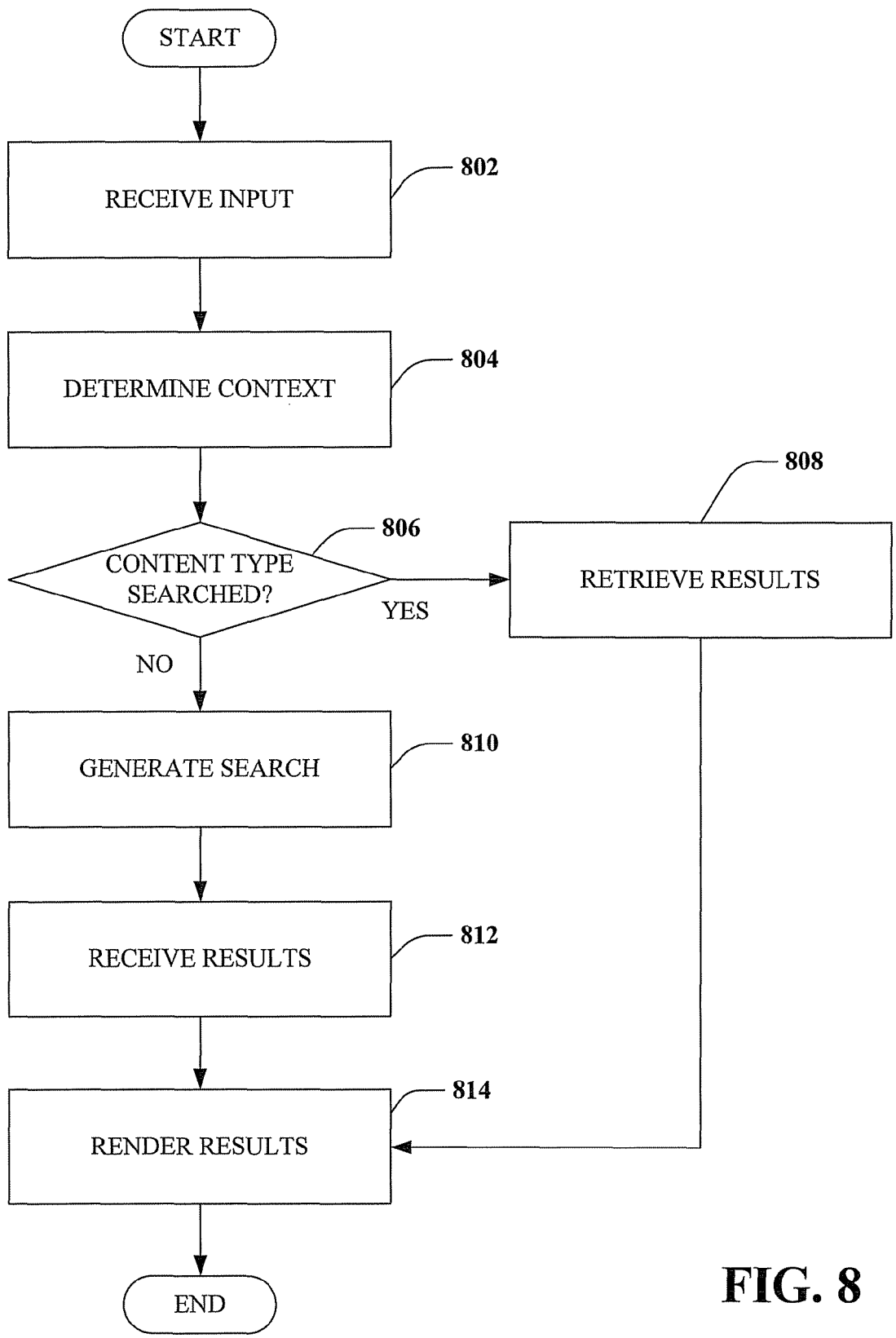
FIG. 8 illustrates a methodology for dynamically updating a search display in accordance with an aspect of the subject matter disclosed herein.

FIG. 8 illustrates a methodology for dynamically updating a search display in accordance with an aspect of the subject matter disclosed herein. At reference numeral 802, navigation input is received. For example, the user can pivot the user interface to display search results of a different type. The context based upon the user input can be determined at 804. Context can include a new content type based upon the pivot of the search results display. At reference numeral 806, a determination can be made as to whether a search has already been performed for the new content type. If yes, the search results are available and can be retrieved at reference numeral 808 and displayed at reference numeral 814. Search results can be available if the user has already navigated to the particular content type. Alternatively, the initial search request can search multiple content types. In either case, the results will be available and can be retrieved and displayed.

If a search has not been performed for that content type, a search can be generated based upon the previous search criteria for a new content type at reference numeral 810. Results for the new search can be received at reference numeral 812 and the search results can be rendered to the display screen at reference numeral 814.

Figure 9:
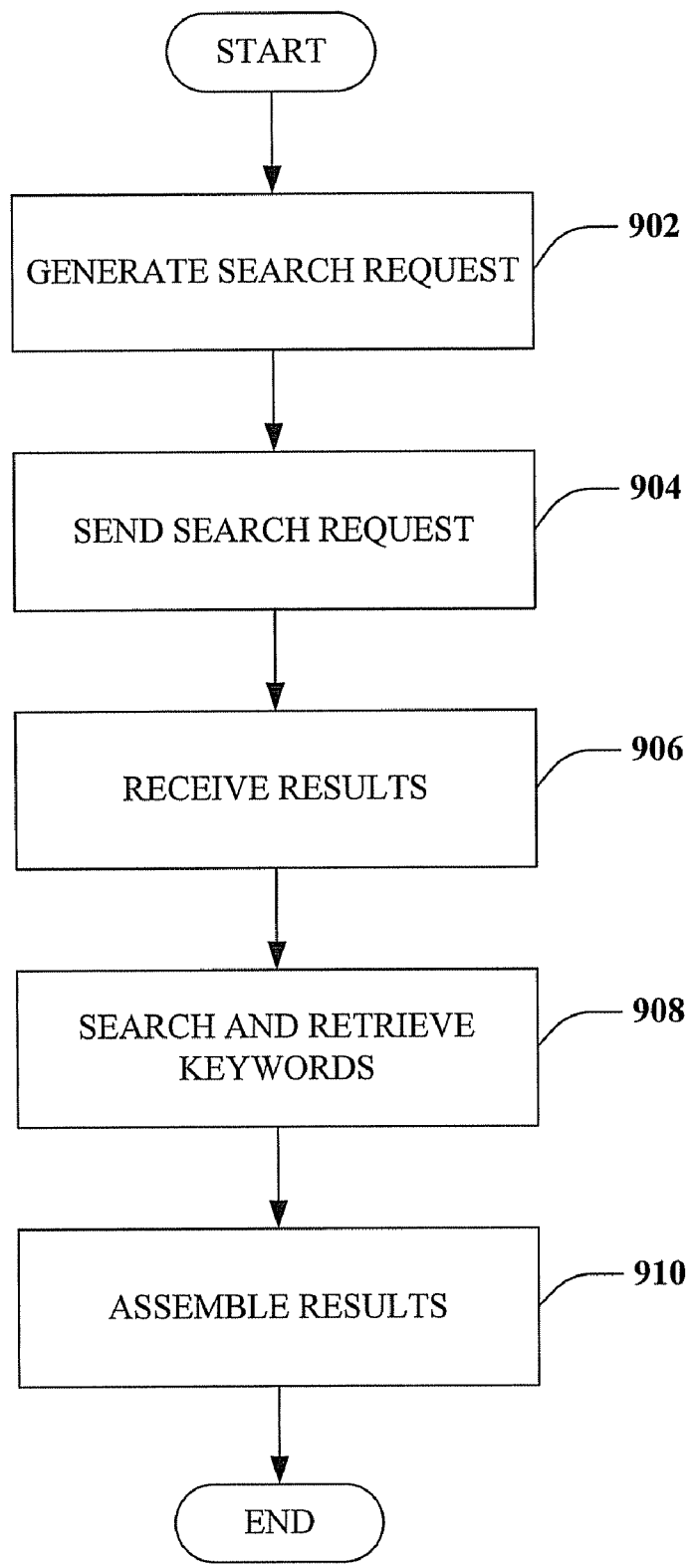
FIG. 9 illustrates a methodology for searching available content in accordance with an aspect of the subject matter disclosed herein.

FIG. 9 illustrates a methodology for searching available content in accordance with an aspect of the subject matter disclosed herein. At reference numeral 902, a request for a search can be generated based upon user input. The request for a search can be a single request, which can be transmitted at reference numeral 904 and used to generate one or more queries for available content of multiple data types. Results of the queries can be received at reference numeral 906. Results can be received in a single block or data structure. Alternatively, results generated based upon separate queries can be separately received. Results can be received until all possible results are received, until a predetermined number or selection of results has been received, until a predetermined time limit has expired, or any combination thereof.

At reference numeral 908, a keyword search is generated. The keyword search determines if any of a set of preexisting keywords match the user input. Results from the keyword search can be received and assembled with the results, if any, of the search of available content at reference numeral 910.

Figure 10:
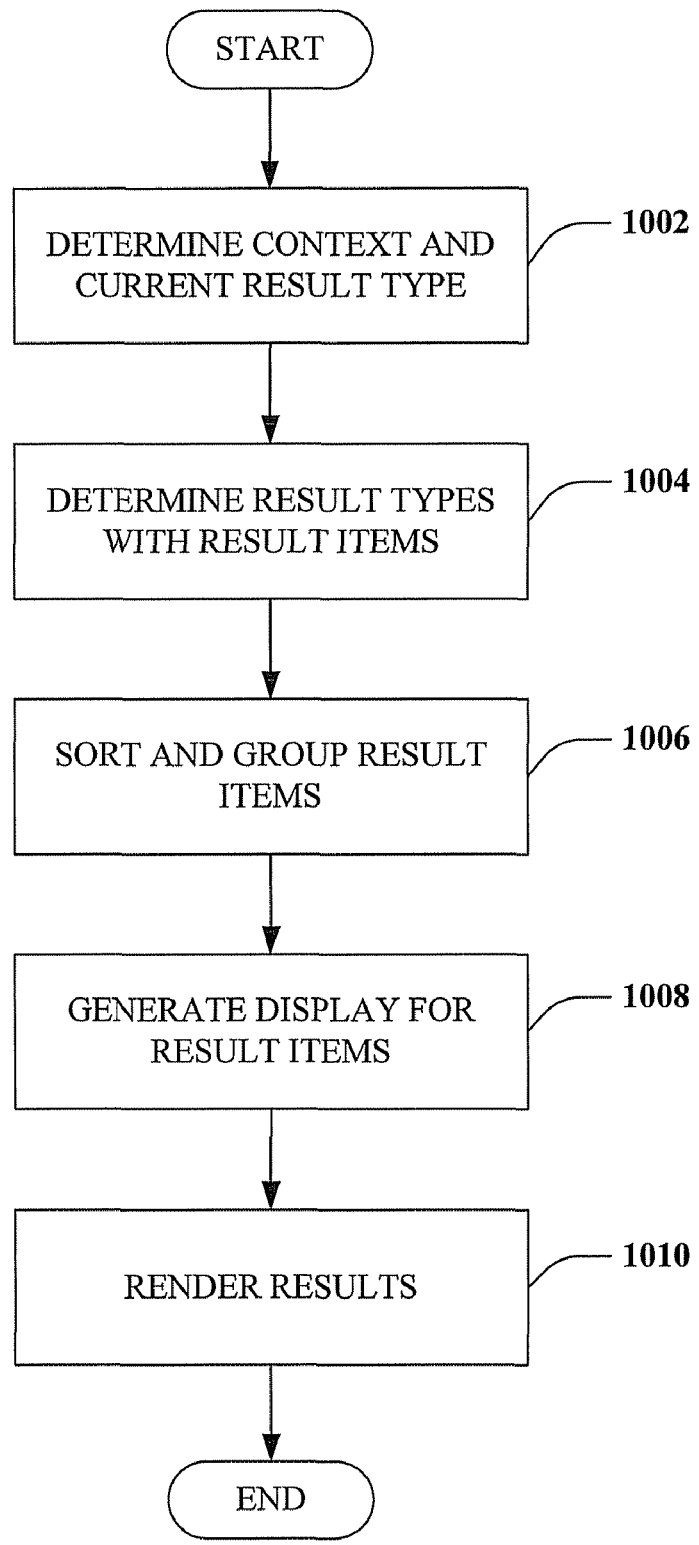
FIG. 10 illustrates a methodology for displaying search results in accordance with an aspect of the subject matter disclosed herein.

FIG. 10 illustrates a methodology for displaying search results in accordance with an aspect of the subject matter disclosed herein. At reference numeral 1002, the context is determined. The context can be used to determine the result group to be displayed in the current result display. At reference numeral 1004, the result types that include data are determined. The pivot control can be updated to reflect those result types that include retrieved data. The resulting items can be organized, grouped or sorted within the result groups at reference numeral 1006 to prepare for display. Result groups can be ordered or organized based upon any criteria, including alphabetical order, numerical order, most recently used and the like. At reference numeral 1008, the display for each individual search result can be determined. For example, search results can include simple text, graphics, icons or other items. At reference numeral 1010, the data can be rendered to the display screen, providing users with the relevant data.

Figure 11:
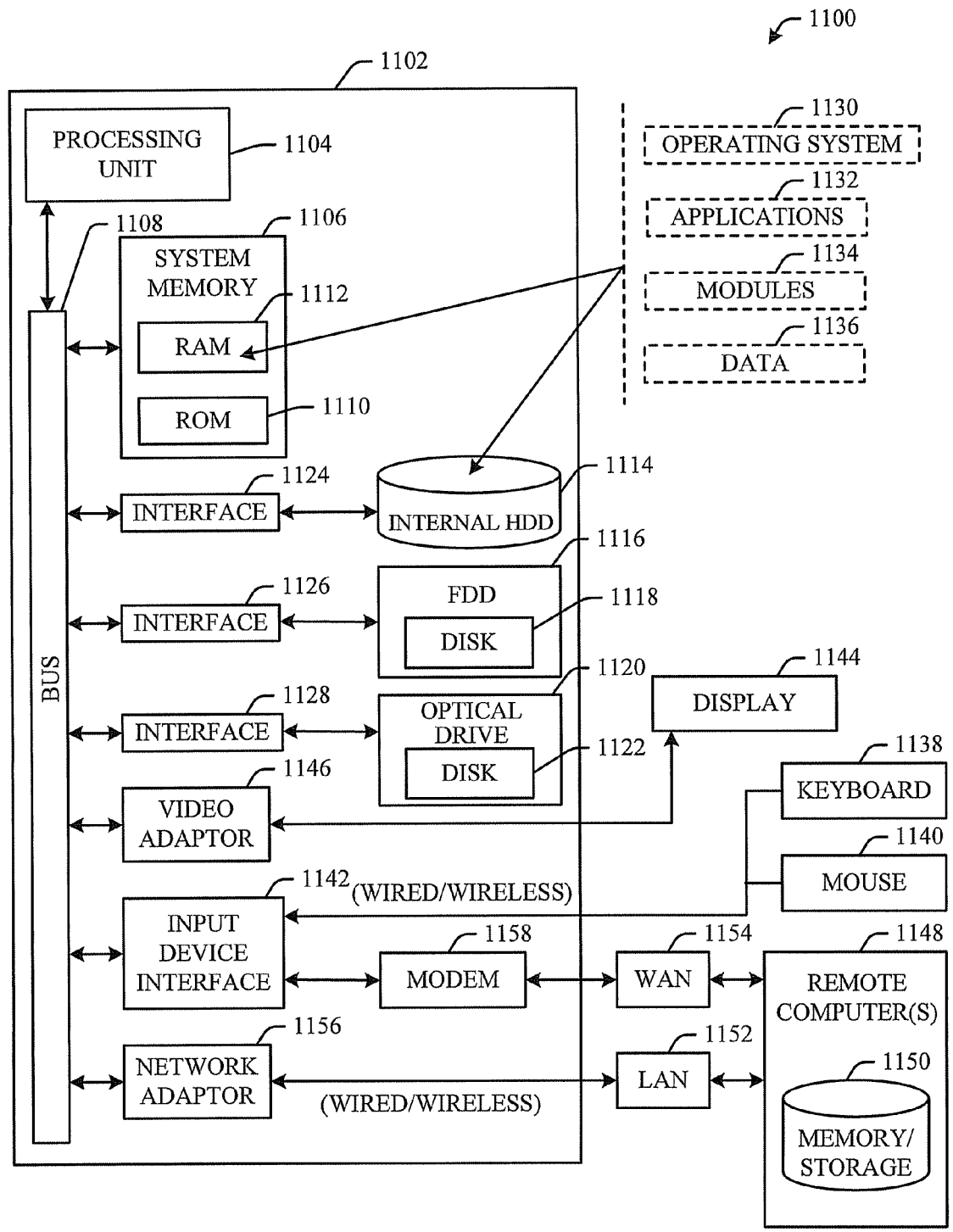
FIG. 11 is a schematic block diagram illustrating a suitable operating environment.
Figure 12:
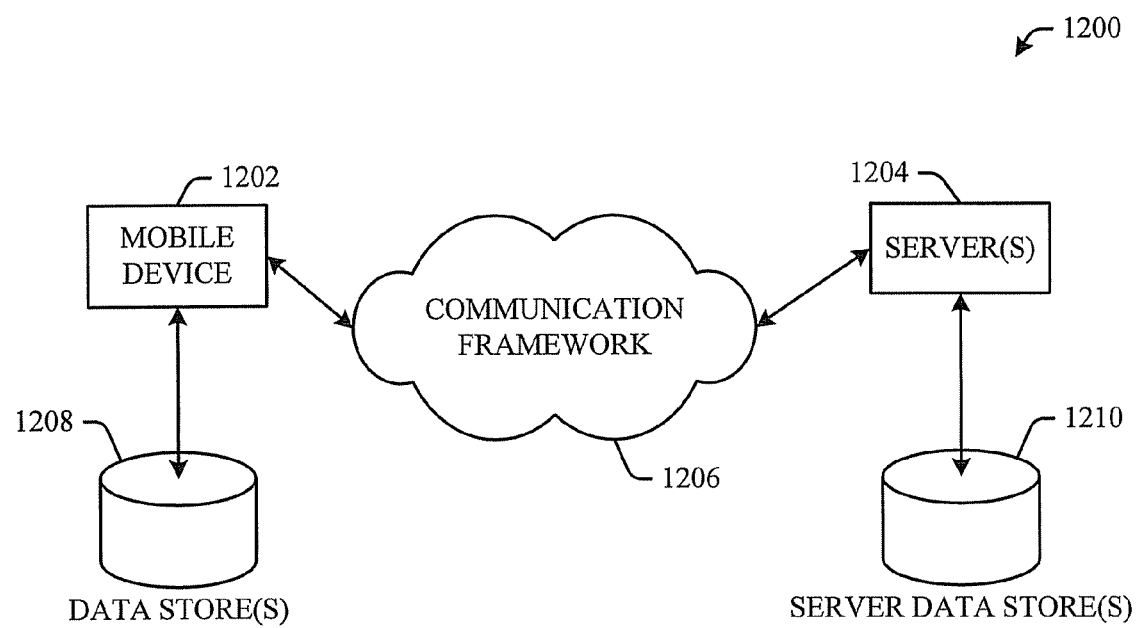
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a mobile device including a computer and/or computers, those skilled in the art will recognize that the innovations described herein also may be implemented in combination with other program modules or software applications. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., PDA, phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the subject matter described herein can be practiced on stand-alone computers, including mobile devices. In a distributed computing environment, program modules may be located in both local and remote memory storage devices.

With reference again to FIG. 11, the exemplary environment 1100 for implementing various aspects of the embodiments includes a mobile device or computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer or mobile device 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1194 interface technologies. Other external drive connection technologies are within contemplation of the subject systems and methods.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the systems and methods can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1194 serial port, a game port, a USB port, an IR interface, etc. A display device 1144 can be used to provide a set of group items to a user. The display devices can be connected to the system bus 1108 via an interface, such as a video adapter 1146.

The mobile device or computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 11156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, PDA, communications satellite, any piece of equipment or location associated with a wirelessly detectable tag (e.g. a kiosk, news stand, restroom), and telephone. The wireless devices or entities include at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 12 is a schematic block diagram of a sample environment 1200 with which the systems and methods described herein can interact. The system 1200 includes one or more mobile device(s) 1202. The mobile device(s) 1202 can be hardware and/or software (e.g. threads, processes, computing devices). The system 1200 also includes one or more server(s) 1204. Thus, system 1200 can correspond to a two-tier client server model or a multi-tier model (e.g., client, middle tier server, data server), amongst other models. The server(s) 1204 can also be hardware and/or software (e.g., threads, processes, computing devices). One possible communication between a mobile device 1202 and a server 1204 may be in the form of a data packet adapted to be transmitted between two or more computer processes. The system 1200 includes a communication framework 1206 that can be employed to facilitate communications between the mobile device(s) 1202 and the server(s) 1204. The mobile device(s) 1202 can be operably connected to or include one or more data store(s) 1208 that can be employed to store information local to the mobile device(s) 1202. Similarly, the server(s) 1204 are operably connected to one or more server data store(s) 1210 that can be employed to store information local to the servers 1204.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system for providing a user interface to obtain content from a plurality of software applications accessible by a mobile device, comprising:
   an interface component for entering a search query into the mobile device, the interface component comprising a key representing multiple characters;
   a search component that receives input generated upon activation of the key and initiates a search based at least in part upon mapping the input to the multiple characters represented by the key; and
   a display component that renders a view of the results of the search on a display screen of the mobile device, the results comprising at least two different matches having a first and a second of the multiple characters respectively.

2. The system of claim 1, further comprising:
   a result component that receives the results of the search and organizes the results of the search into a plurality of result groups based at least in part upon data type.

3. The system of claim 2, the plurality of result groups are managed as a circular list and the view of the results of the search includes a list view of one of the plurality of result groups.

4. The system of claim 3, further comprising: a pivot component that manages navigation among the plurality of result groups.

5. The system of claim 1, the results of the search include at least one result item and at least one task associated with the result item.

6. The system of claim 1, further comprising:
   a keyword component for managing at least one keyword that constitutes a shortcut search term when initiating a search for content associated with the at least one keyword.

7. The system of claim 1, wherein the interface component is a keypad of the mobile device and the at least one key represents a number and a plurality of letters of an alphabet.

8. The system of claim 7, wherein the search is directed at retrieving results containing a) the number or b) at least one of the plurality of letters.

9. The system of claim 1, wherein the interface component further comprises an additional key representing multiple characters, wherein the multiple characters of the additional key are different than the multiple characters of the at least one key; and further wherein the search component is configured to initiate the search based on combining the multiple characters of the at least one key and the multiple characters of the additional key.

10. A method of searching a plurality of content sources accessible from a mobile device for content, comprising:
    entering a search criterion into the mobile device;
    initiating a search of the plurality of content sources based at least in part upon the search criterion;
    generating a set of data requests as a function of the search and distributing each data request in the set of data requests to an associated data supplier component;
    receiving in the mobile device, a plurality of search results;
    sorting the search results into a plurality of categories;
    associating the plurality of categories with a corresponding plurality of icons;
    rendering on a display screen of the mobile device, a first view containing results pertaining to a first category;
    displaying in the first view, a search result control bar showing at least some of the plurality of icons; and
    providing focus upon a first icon to indicate that the search results currently displayed on the display screen belongs to the first category corresponding to the first icon.

11. The method of claim 10, further comprising:
    generating an alternate search based at least in part upon an alternate interpretation of the search criterion.

12. The method of claim 10, further comprising:
    searching a plurality of keywords based upon the search criterion, each of the plurality of keywords is associated with content; and
    incorporating the result of the keyword search into the at least one result from the search.

13. The method of claim 10, the plurality of content sources includes a source remote from the mobile device.

14. The method of claim 10, wherein the first view is limited solely to results pertaining to the first category, and additional results are viewable by clicking on additional icons in the search result control bar.

15. The method of claim 10, wherein the search result control bar is displayed in a horizontal viewing format and navigating through the plurality of icons is carried out by operating upon a pivot control to sequentially move the plurality of icons in a horizontal direction.

16. The method of claim 15, wherein sequentially moving the plurality of icons in a horizontal direction comprises moving the plurality of icons in a continuous loop inside the search result control bar.

17. The method of claim 10, wherein entering a search criterion comprises activating a first key that represents multiple characters, and wherein initiating the search comprises mapping the multiple characters of the first key into a plurality of searches each of which is directed at acquiring search results containing at least one of the multiple characters.

18. The method of claim 17, wherein the first key represents a number and a plurality of letters of an alphabet.

19. A system for obtaining content from a plurality of software applications, comprising:

means for executing a plurality of processes on a processor, the plurality of processes provided via a plurality of means, including:

means for detecting activation of a first key, wherein the first key represents multiple characters;

means for mapping the multiple characters into multiple search queries;

means for receiving a data supplier component from each of the plurality of software applications onto a content manager, each data supplier component capable of retrieving data from an underlying data store in a corresponding software application;

means for registering a set of data categories and tasks associated with each of the plurality of software applications onto the content manager;

means for initiating a search of the plurality of applications based at least in part upon the multiple search queries, the content manager generating a set of data requests as a function of the search and distributing each data request in the set of data requests to an associated data supplier component;

means for obtaining search results; and means for displaying a view of the search results.

20. The system of claim 19, further comprising:

means for managing a plurality of shortcuts, each of the plurality of shortcuts provides access to content; and means for searching the plurality of shortcuts and returning shortcut results with the search results.

\* \* \* \* \*